US005247285A

United States Patent [19]

Yokota et al.

[11] Patent Number: 5,247,285

[45] Date of Patent: Sep. 21, 1993

[54] STANDUP PORTABLE PERSONAL COMPUTER WITH DETACHABLE WIRELESS KEYBOARD AND ADJUSTABLE DISPLAY

[75] Inventors: Masao Yokota, Santa Cruz; John T. Hui; Wayne A. Yankee, both of San Jose, all of Calif.

[73] Assignee: Everex Systems, Inc., Fremont, Calif.

[21] Appl. No.: 847,640

[22] Filed: Mar. 6, 1992

[51] Int. Cl.[5] ............ G09G 3/02

[52] U.S. Cl. ............ 345/169; 364/708; 248/919; 361/680; 361/681; 361/732

[58] Field of Search ............ 361/380, 390, 391, 392, 361/393, 394, 395; 364/708; 248/917, 918, 919, 920, 921, 922, 923; D14/106; 340/700, 711; 341/22

[56] References Cited

U.S. PATENT DOCUMENTS

| | | | |
|---|---|---|---|
| D. 250,588 | 12/1978 | Mayer et al. | D14/43 |
| D. 254,005 | 1/1980 | Reid et al. | D14/43 |
| D. 263,586 | 3/1982 | Murez | D14/106 |
| D. 272,351 | 1/1984 | Moraine | D14/106 |
| D. 275,102 | 8/1984 | MacConnell | D14/106 |
| D. 275,756 | 10/1984 | Stirling | D14/106 |
| D. 316,545 | 4/1991 | Esslinger et al. | D14/106 |
| 4,571,456 | 2/1986 | Paulsen et al. | 179/2 C |
| 4,669,694 | 6/1987 | Malick | 248/923 |
| 4,769,764 | 9/1988 | Levanon | 364/708 |
| 4,937,564 | 6/1990 | Oberg | 340/709 |
| 5,021,922 | 6/1991 | Davis et al. | 361/380 |
| 5,034,858 | 7/1991 | Kawamoto et al. | 364/708 |
| 5,107,402 | 4/1992 | Malgouires | 364/708 |

*Primary Examiner*—Tommy Chin
*Assistant Examiner*—A. Au
*Attorney, Agent, or Firm*—Blakely, Sokoloff, Taylor & Zafman

[57] ABSTRACT

A portable personal computer is provided that includes a main housing having a base and an upper housing erecting on top of the base for containing circuitry of the portable personal computer. The base contains a power supply unit for the computer. The upper housing includes a top end and an inner wall. A display is pivotally attached to the upper housing adjacent the top end of the upper housing such that the display is held against the inner wall of the upper housing in a closed position. A detachable keyboard is provided which has a top row and a bottom row for inputting data into the portable personal computer. The keyboard is mounted onto the portable personal computer and covers the display in the closed position such that the computer constitutes an integrated entity. The keyboard is removed from the computer in an open position for operation. The display is exposed when the keyboard is removed from the computer. The display can swing away from the inner wall of the upper housing in the open position. A latch and detent assembly is also provided for locking the keyboard onto the computer in the closed position and for holding the display at a desired angle for viewing when the display swings away from the inner wall of the upper housing in the open position. The latch and detent assembly for the portable personal computer is also described.

12 Claims, 6 Drawing Sheets

FIG_2

FIG_3

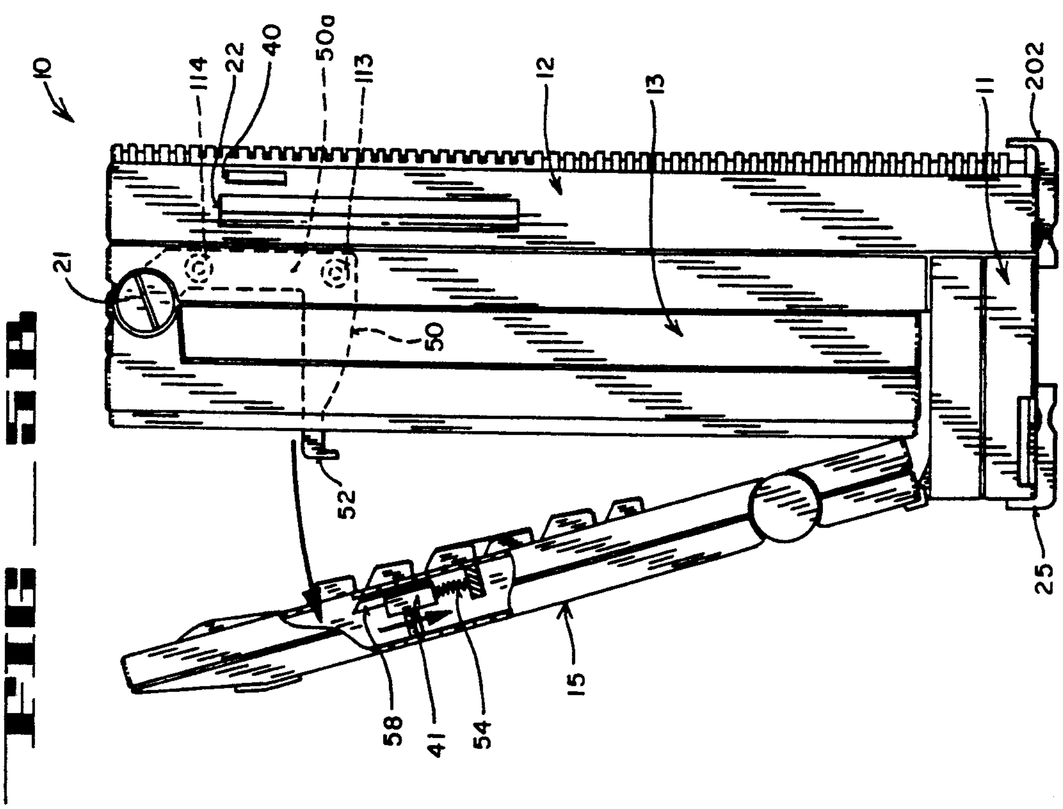
FIG — 5B
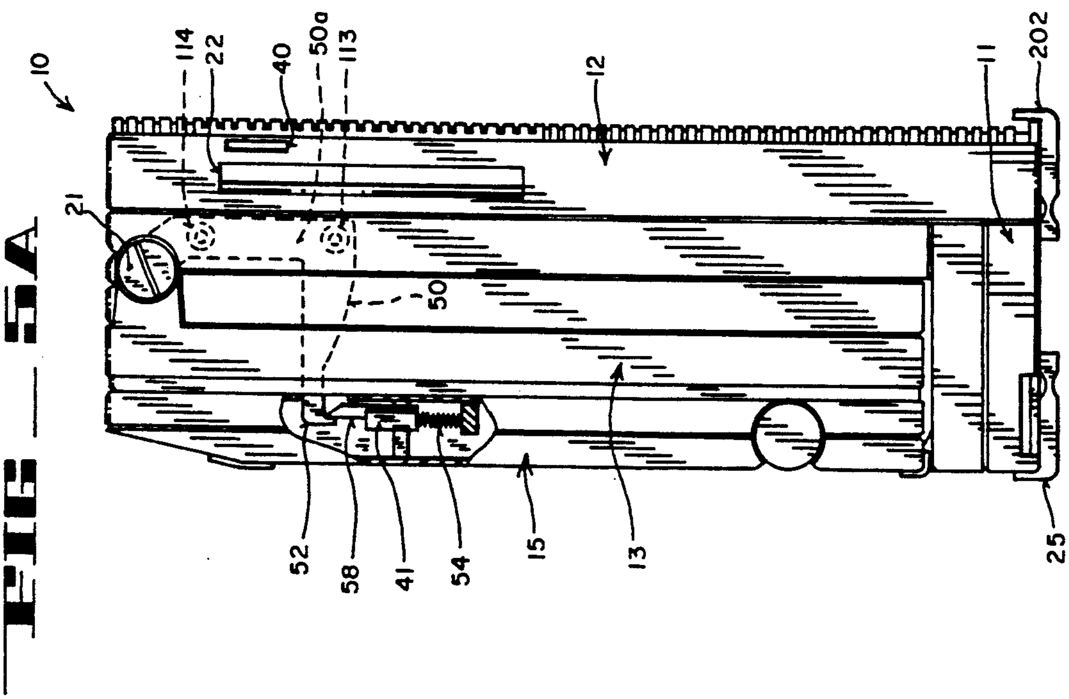
FIG — 5A

STANDUP PORTABLE PERSONAL COMPUTER WITH DETACHABLE WIRELESS KEYBOARD AND ADJUSTABLE DISPLAY

FIELD OF THE INVENTION

The present invention pertains to the field of computer systems. More particularly, this invention relates to a standup portable personal computer system having a detachable keyboard and an adjustable display.

BACKGROUND OF THE INVENTION

In the field of personal computers, computers are typically made portable and may be carried from place to place. These computers are commonly referred to as "portable personal computers." One type of the portable personal computers are typically referred to as "desk-top" computers. Another type of the portable personal computers are typically referred to as "lap-top" computers.

Typically, the desk-top computer includes a keyboard unit, a display unit, and a main unit which contains all of the essential circuitry of the computer, such as the central processing unit (CPU), the power supply, and data storage devices (e.g., floppy or hard disk). These units are typically physically distinct entities.

One disadvantage associated with the desk-top computer is that a separate container is typically required to hold these distinct units together when the computer is carried from place to place. This is because a desk-top computer is typically configured by physically distinct units, as described above. The physically distinct units of the desk-top computer weakens the portability of the computer.

In order to enhance the portability of the personal computers, the lap-top computers are developed which are configured differently from the desk-top computers. A lap-top computer is typically a single, integrated unit. All of the elements of the computer are placed within one housing. The lap-top computer typically includes a main body which contains all of the essential circuitry of the computer. Attached to the front of the main body are a keyboard unit and a display unit. The display unit is typically connected to the main body by a hinge. The display unit is placed over the keyboard unit and can be opened upwards by the hinge. The integrated nature of the lap-top computers is desirable because it enhances their portability.

One disadvantage associated with the lap-top computer is that the computer requires a relatively large integer surface space for the user to operate. This is due to the integrated nature of the lap-top computers. Both the keyboard unit and the display unit are integrated parts of the computer and cannot be removed from the main body when in use.

Other prior approaches to enhancing the portability of the personal computer are also available. One such prior solution is referred to in U.S. Pat. No. Des. 272,351, issued on Jan. 24, 1984, entitled "DATA TRANSMISSION TERMINAL." The terminal disclosed includes a main housing with a display in the front. A keyboard is pivotally attached to the main housing (see FIGS. 1–3 and 5–6) and can be rotatably lifted to close with the main housing, covering the display (see FIGS. 4 and 7).

This prior approach disclosed in U.S. Pat. No. Des. 272,351, nonetheless, fails to disclose a computer with a detachable keyboard that can be removed from the computer in operation, and a display that is pivotally attached to the main housing. In addition, the prior approach fails to disclose a computer with a base and an upper housing erecting on top of a portion of the base.

SUMMARY AND OBJECTS OF THE INVENTION

One of the objects of the prevent invention is to provide a portable personal computer which can be easily carried from place to place as an integrated unit and which includes physically distinct units.

Another object of the present invention is to provide a portable personal computer which requires a relatively small integral surface space when in operation.

Another object of the present invention is to provide a latch and detent assembly for the portable personal computer that can also adjust the angle of the display unit.

A portable personal computer is provided. The portable personal computer, in one embodiment, includes a main housing having a base and an upper housing erecting on top of the base for containing circuitry of the portable personal computer. The base contains a power supply unit for the computer. The upper housing includes a top end and an inner wall. A display is pivotally attached to the upper housing adjacent the top end of the upper housing such that the display is held against the inner wall of the upper housing in a closed position. A detachable keyboard is provided which has a top row and a bottom row for inputting data into the portable personal computer. The keyboard is mounted onto the portable personal computer and covers the display in the closed position such that the computer constitutes an integrated entity. The keyboard is removed from the computer in an open position for operation. The display is exposed when the keyboard is removed from the computer. The display can swing away from the inner wall of the upper housing in the open position. A latch and detent assembly is also provided for locking the keyboard onto the computer in the closed position and for holding the display at a desired angle for viewing when the display swings away from the inner wall of the upper housing in the open position.

A portable personal computer having a latch and detent assembly is described. The portable personal computer includes a main housing having a base and an upper housing erecting on top of the base, a display pivotally attached to the upper housing adjacent the top end of the upper housing, and a detachable keyboard. The latch and detent assembly is provided for locking the keyboard onto the computer in a closed position and for holding the display at a desired angle for viewing when the display swings away from the upper housing in an open position. The latch and detent assembly, in one embodiment, includes a hook structure having an arm with a first end and a second end, a downward extending bar coupled to the first end of the arm, and a hook coupled to the second end of the arm. The bar is coupled adjacent the top end of the upper housing and is located inside the upper housing. The arm passes through the display to deliver the hook. The arm includes a curved bottom edge that reflects the swing movement of the display. The arm includes a plurality of notches spaced along the curved bottom edge. A locking means is coupled to the keyboard for releasably engaging the hook of the hook structure such that the keyboard can be mounted and locked onto the computer and covers the display in the closed position in order for the computer to constitute an integrated entity. The locking means disengages the hook to remove the keyboard from the computer in the open position. The display is exposed when the keyboard is removed from the computer. A detent means is coupled to the display and having a protruding end portion that can slide into each of the plurality of notches for engaging one of the plurality of notches along the arm in the open position in order to detain the display at a desired angle for viewing. The end portion of the detent means slides through the plurality of notches when the display swings away from the inner wall of the upper housing by an external force. When the display stops its swing movement and the end portion slides into the one of the plurality of notches, the display is detained by the detent means from free swinging back against the inner wall. The desired angle for viewing of the display is adjustable by sliding the detent means into different ones of the plurality of notches.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the FIGURES of the accompanying drawings, in which like references indicate similar elements and in which:

FIG. 3 illustrates a plurality of notches on each of the arms and each of the detent members engaging a notch of each arm;

FIG. 5A is a side view of the computer in the enclosed position, FIG. 5A shows a hook and a locking member of the latch and detent assembly engaged together;

FIG. 5B is another side view of the computer illustrating the hook being released from the locking member;

DETAILED DESCRIPTION

Figure 1:
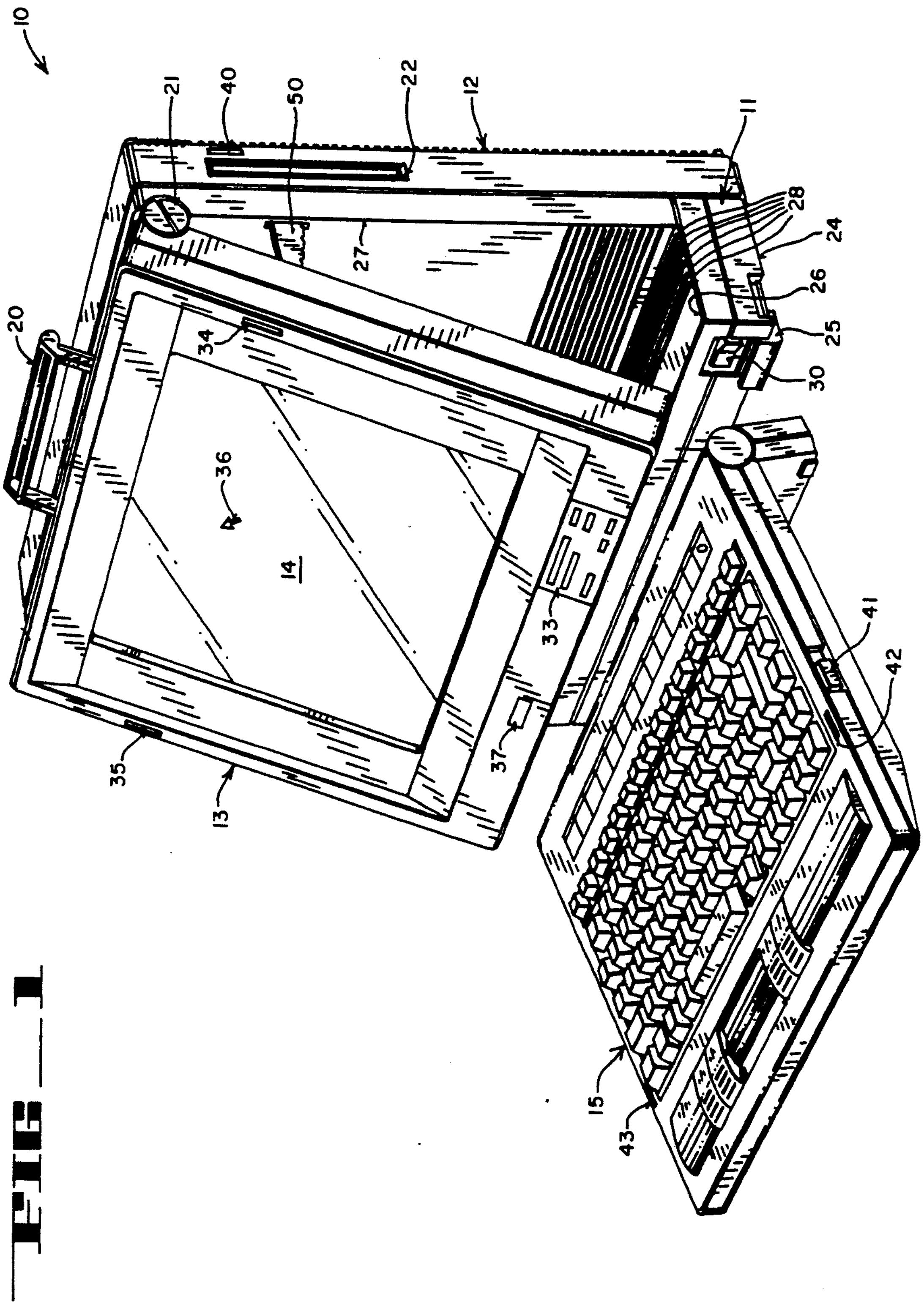
FIG. 1 is a perspective view of a portable personal computer according to one preferred embodiment of the present invention in an open position for use, including a base, an upper housing, a display unit, and a detachable keyboard unit.

Referring to FIG. 1, a perspective view of a computer 10 in accordance with a preferred embodiment of the present invention is shown, which includes a base 11, an upper housing 12, a display unit 13, and a keyboard unit 15. FIG. 1 illustrates computer 10 in an open position for use. Although computer 10 can be any of a variety of computers, computer 10 in the presently preferred embodiment in a portable personal computer.

Base 11 is a flat rectangular housing with a bottom surface 24 and a top surface 26. On top of base 11 is upper housing 12 which is an upward extending housing. As can be seen from FIG. 1, upper housing 12 includes an inner wall 27 and a back surface (not shown in FIG. 1). Base 11 and upper housing 12 each includes an inner chamber for housing electronic circuitry of computer 10.

Upper housing 12 is erected on top of base 11 such that an L-shaped structure is formed by base 11 and upper housing 12 together. In the presently preferred embodiment, the height of upper housing 12 is much greater than the length of base 11. In this case, base 11 which represents the horizontal arm of the L-shaped structure, is much shorter than the upper housing 12 which represents the vertical arm of the L-shaped structure. Base 11 and upper housing 12 together constitute the main housing of computer 10. In one preferred embodiment, the inner chambers of base 11 and upper housing 12 are connected together. In this case, base 11 and upper housing 12 are one entity. In another preferred embodiment, the inner chambers for base 11 and upper housing 12 are not connected. In this case, upper housing 12 is fixed onto base 11.

Both base 11 and upper housing 12, in the preferred embodiment, are made from injection molded plastic material. Inside base 11 and upper housing 12, there are all the essential and well known electronic circuitry for the computer's operation, such as central processing unit (CPU), memory, hard and/or floppy disk drives, input/output circuitry, and power supply (all are not shown in FIG. 1).

In one preferred embodiment, the CPU of computer 10 comprises an 80386 microprocessor (i.e., i386™ CPU) manufactured by Intel Corporation of Santa Clara, Calif. In another preferred embodiment, the CPU comprises an 80486 microprocessor (i.e., i486™ CPU) also manufactured by Intel Corporation. In alternative embodiments, the CPU may comprise other types of microprocessors manufactured by other companies.

The electronic circuitry of computer 10 may also include other well known electronic circuits or devices, such as a serial communication interface circuit, a parallel communication interface circuit, a MODEM, and a local area network (LAN) interface circuit. It shall be noted that computer 10, however, can readily operate as a functional computer without the presence of some or all of these circuits.

Base 11 includes a power switch 30 that controls the ON and OFF of the power supply, and therefore controls the ON and OFF of computer 10. In addition, base 11 includes a socket (not shown in FIG. 1) at its back surface for connecting to an external power source via a connection line.

Functionally speaking, the power supply of computer 10 receives and converts the external power source into a DC power source suitable for the electronic circuitry of computer 10. Typically, the external power source is an AC power source and the power supply may include a transformer that transforms the voltage level of the external power source into a lower voltage level, and an AC-DC converter that converts the lowered AC voltage into a DC voltage suitable for the circuitry of computer 10. Alternatively, the power supply may also include a rechargeable battery that allows computer 10 to be capable of operating without the external power source. These components of the power supply typically cause the power supply to be the heaviest unit within computer 10.

In the presently preferred embodiment, the power supply is housed in base 11. There are a number of advantages associated with this arrangement. First, the balance of computer 10 is well maintained as base 11 is the bottom portion of computer 10. To contain the power supply in base 11 makes base 11 the heaviest part of computer 10. This allows computer 10 to be well balanced during operation.

Secondly, this arrangement allows computer 10 to occupy less surface space for maintaining the balance of the computer during operation. Typically, a computer with a relatively high upper housing 12 has a high center of gravity in it. In order to balance with the high center of gravity, a larger base is typically required. To contain the power supply in base 11 has the effect of having a large base, thus making it possible for computer 10 to have an actual smaller base 11.

Thirdly, this arrangement permits an upward extending upper housing 12 with a high height to be erected on top of base 11 without harming the balance of computer 10. In this case, more space can be developed in upper housing 12 for containing more electronic circuitry of computer 10.

Figure 3:
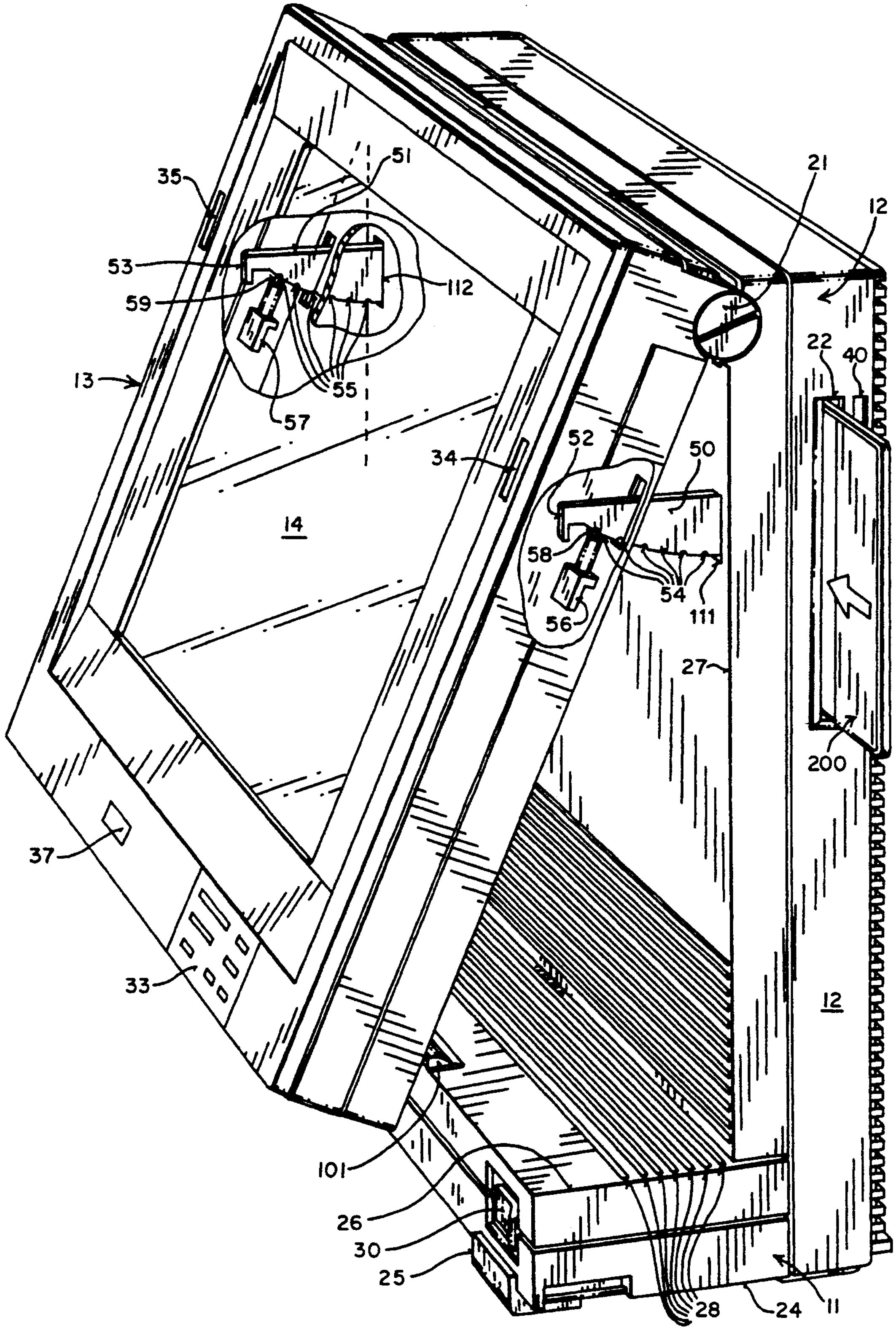
FIG. 3 is a perspective view of the display unit in an angled position held by two detent members of the latch and detent assembly engaging two arms of the hooks of the latch and detent assembly when the computer is in the open position.

On part of the top surface 26 of base 11 that is not coupled to upper housing 12, there are a number of slots 28 which are employed to dissipate heat generated by the power supply away from the inside of base 11. FIG. 3 also illustrate the slots 28.

On the right side of upper housing 12 as shown in FIG. 1, a slot 22 is shown which is part of a conventional floppy disk drive (see also FIGS. 2-3, 5A and 5B). Slot 22 allows a floppy disc 200 (FIG. 3) to be inserted into the floppy disk drive located inside upper housing 12. Adjacent slot 22, there is a light indicator 40 which, when is on, indicates the existence of floppy disk 200 inside the floppy disk drive.

Figure 2:
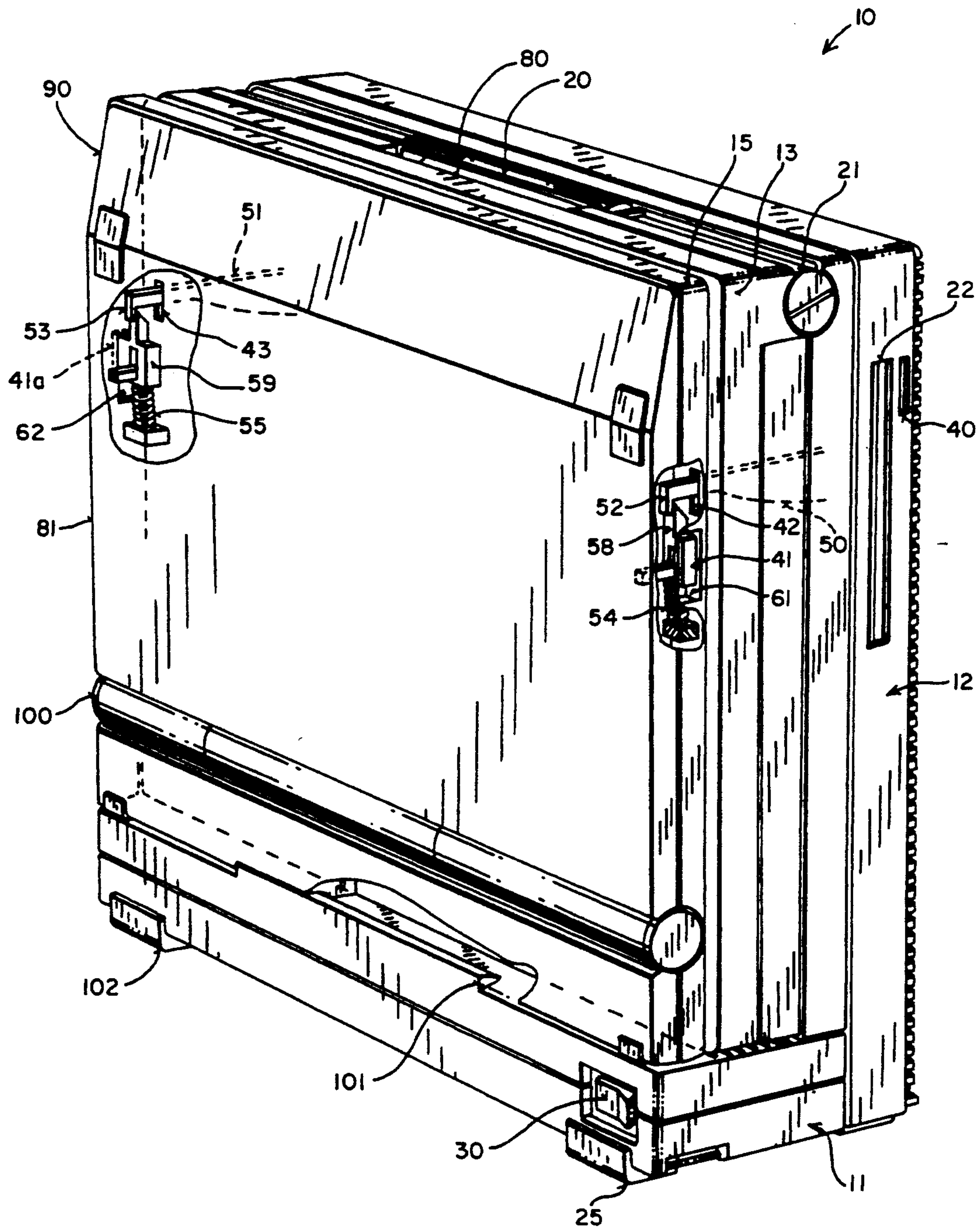
FIG. 2 is another perspective view of the computer in a closed position, FIG. 2 also shows a latch and detent assembly of the computer, including two hooks and two locking members.

Adjacent inner wall 27 of upper housing 12 is display unit 13 which contains a display screen 14 and associated circuitry (not shown). In the presently preferred embodiment, display screen 14 in a color liquid display unit. In alternative embodiments, display screen 14 can be a video monitor or any other well known display devices. Display screen 14 is framed at the center of display unit 13. In the presently preferred embodiment, display screen 14 is a recessed display screen on display unit 13 such that when computer 10 is in a closed position as shown in FIG. 2, the recessed display screen 14 can be kept from being touched by keyboard unit 15.

As can be seen from FIG. 1, display unit 13 is coupled adjacent the top end of inner wall 27 of upper housing 12 by a hinge means 21. Hinge means 21 allows display unit 13 to be suspended over base 11 and against inner wall 27 of upper housing 12. Hinge means 21 also allows display unit 13 to swing away from inner wall 27 of upper housing 12 such that display unit 13 can be positioned in an angled position for viewing as shown in FIG. 1 by means of a latch and detent assembly which will be described below, in conjunction with FIGS. 2-5B. The angled position of display unit 13 for viewing can be adjusted by the latch and detent assembly at the user's desire. Hinge means 21 will also be described below, in conjunction with FIG. 4.

Display screen 14 displays a movable cursor 36. Movable cursor 36 is moved and positioned by means of a cursor control device on keyboard unit 15 which will be described below, in conjunction with FIG. 6. The movable cursor 36 is typically employed to point and choose software options displayed on display screen 14 or to input data in a graphics format in computer 10 (e.g., drawing images on display screen 14).

Display unit 13 is of the same width as that of upper housing 12 and base 11. The height of display unit 13 is slightly less than that of upper housing 12 such that a gap is formed between base 11 and display unit 13. This gap is big enough for display unit 13 to swing back and forth about hinge means 21. The thickness of display unit 13 is such that, when computer 10 is in the closed position as shown in FIG. 2, the total thickness of upper housing 12, display unit 13, and keyboard unit 15 is equal to the length of base 11.

Referring to FIG. 2, computer 10 is shown in the closed position. In FIG. 2, computer 10 looks like an integrated unit and can be easily carried from place to place. Display unit 13 is shown to be held against upper housing 12 in the closed position. In addition, display unit 13 is covered by keyboard unit 15 in the closed position. As a matter of fact, display unit 13 is sandwiched by upper housing 12 and keyboard unit 15 in the closed position.

Referring back to FIG. 1, display unit 13 also includes an indicator panel 33 below display screen 14. Indicator panel 33 is employed to indicate the status and conditions of computer 10. Indicator panel 33, in the presently preferred embodiment, includes a power indicator, a status indicator, a hard disk drive indicator, a floppy disk drive indicator, and a number of keyboard lock indicators, such as a capital lock indicator, a SCR lock indicator, and a numeral lock indicator.

Display unit 13 also includes two slots 34 and 35 that can be seen through from one side of display unit 13 to the other side. The function of these two slots 34 and 35 will be described below, in conjunction with FIGS. 2-5B.

Display unit 13 also includes a receiver 37 below display screen 14. In one preferred embodiment, receiver 37 is an infrared signal receiver that receives infrared signals. In another preferred embodiment, receiver 37 is a radio signal receiver that receives radio frequency signals. Receiver 37 also includes circuitry (not shown) to demodulate data carried by the infrared signals or the radio frequency signals. The function of receiver 37 will be described in detail below, in connection with FIG. 6.

Referring to FIGS. 1 and 2, keyboard unit 15 of computer 10 is a detachable keyboard unit of computer 10 which can be removed from computer 10 for operation in the open position. As can be seen from FIG. 1, when keyboard unit 15 is in the open position for use, display unit 13 is exposed and can be seen by the user. Keyboard unit 15 allows the user to communicate (e.g., input data into) with computer 10. Keyboard unit 15 also provides a supporting base for the user's hands to rest against when using keyboard unit 15.

Keyboard unit 15 is typically held in the closed position by means of the latch and detent assembly when computer 10 is not being used and is closed, as shown in FIG. 2. When keyboard unit 15 is held in the closed position, display unit 13 is covered by keyboard unit 15 and computer 10 is formed into an integrated unit (FIG. 2) which can be easily carried from place to place. When keyboard unit 15 is the in open position as shown in FIG. 1 which reveals display unit 13, computer 10 does not look like an integrated entity. Keyboard unit 15 also includes a hinge means 100 (FIG. 2). Keyboard unit 15 will be described in more detail below, in conjunction with FIG. 6.

The detachability of keyboard unit 15 to computer 10 has a number of advantages. First, when keyboard unit 15 is held on computer 10 in the closed position as shown in FIG. 2, computer 10 is an integral entity like a laptop computer which can be easily carried from place to place.

Secondly, when keyboard unit 15 is detached from computer 10 for use during any operation, it can be placed on top of the user's lap while the main part of computer 10 which includes base 11, upper housing 12, and display unit 13 can be placed on a separate flat surface. This relaxes the surface requirement for a portable computer. As is known, a laptop computer typically requires an integral space for operation since the computer is typically designed to be an integrated unit. A desktop computer also requires a large flat surface for both the computer and the keyboard. However, computer 10 with detachable keyboard unit 15 can operate without a large integral space.

Thirdly, the detachability of keyboard unit 15 allows computer 10 to operate in the laptop environment as described above while eliminating the weight requirement imposed onto the computer. Because laptop computers are typically designed to operate in the laptop environment, they are required to be as light in weight as possible. Therefore, laptop computers typically do not have many functions that other types of portable computers have. However, computer 10 of the present invention can incorporate as many functions as the user desires to have while can still be used in the laptop environment. This is because the main part of computer 10 needs not be placed on user's lap when computer 10 is used in the laptop environment.

As can also be seen from FIG. 2, base 11 also includes a ridge 101. Ridge 101 is located on the top surface of base 11. FIG. 3 also illustrates a portion of ridge 101. Ridge 101 is employed to hold the rear end of keyboard unit 15 in position when keyboard unit 15 is locked to computer 10 in the closed position.

Referring to FIGS. 1 and 2, computer 10 also includes a retractable handle 20. FIG. 1 illustrates handle 20 in an extended position. FIG. 2 illustrates handle 20 in a retracted position.

Handle 20 is housed in an open ended chamber 80 (shown in FIG. 2) when retracted. Chamber 80 is formed by upper housing 12 and display unit 13 near a center area between upper housing 12 and display unit 13. Along two sides of chamber 80 is the hinge means 21. Chamber 80 is big enough to allow a finger in to pull up handle 20. Handle 20 is initially positioned inside chamber 80 as shown in FIG. 2. When needed, an external force is used to lift handle 20 up out of chamber 80 (as shown in FIG. 1) for carrying computer 10. When not needed, handle 20 can slide back into chamber 80 itself or by a slight push. The structure of handle 20 will be described in more detail below, in conjunction with FIG. 4.

As described above, computer 10 also includes the latch and detent assembly (shown in FIGS. 2-5B) that latches computer 10 in the closed position as shown in FIGS. 2 and 5A, and holds display unit 13 of computer 10 at the angled position for viewing as shown in FIGS. 1 and 3 during operation. The latch and detent assembly of computer 10 is described below, in conjunction with FIGS. 2-5B.

Referring to FIG. 2, keyboard unit 15 is held on top of base 11, covering display unit 13 in the closed position. As also can be seen from FIG. 2, keyboard unit 15 is held and located in the closed position by the latch and detent assembly. FIG. 2 illustrates several elements of the latch and detent assembly.

As shown in FIG. 2, the latch and detent assembly includes two slots 42 and 43 on keyboard unit 15. The latch and detent assembly also includes two arms 50 and 51 passing through display unit 13 from upper housing 12. Arms 50 and 51 deliver two hooks 52 and 53, respectively. Arms 50 and 51 will be described in more detail below, in connection with FIGS. 3-5B. Hooks 52 and 53 can extend into the inside of keyboard unit 15 via slots 42 and 43 in the closed position as shown in FIG. 2. In the presently preferred embodiment, hooks 52 and 53 are downwardly extending. In alternative embodiments, hooks 52 and 53 may be in other shapes. For example, hooks 52 and 53 may be upwardly extending.

The latch and detent assembly also includes two locking members 58 and 59 inside keyboard unit 15. Locking members 58 and 59 are located beneath slots 42 and 43, respectively, for engaging hooks 52 and 53. Locking members 58 and 59 are spring loaded by springs 54 and 55 respectively such that locking members 58 and 59 are biased towards the front end of keyboard unit 15. As is used in this description, the front end of keyboard unit 15 refers to the end which is close to the user in the open position (FIG. 1) and which is adjacent hinge means 21 in the closed position (FIG. 2). The bias normally holds the locking members 58 and 59 securely engaged with hooks 52 and 53 inside slots 42 and 43 as shown in FIG. 2.

Locking members 58 and 59 include release buttons 41 and 41*a*, respectively. Release buttons 41 and 41*a* are located at both sides of keyboard unit 15 within slots 61 and 62, respectively. To release locking members 58 and 59 from hooks 52 and 53, respectively, the release buttons 41 and 41*a* are pushed downward, thus releasing locking members 58 and 59 from hooks 52 and 53.

FIG. 3 illustrates display unit 13 held in the angled position with respect to upper housing 12. As can be seen from FIG. 3, display unit 13 is swung away from inner wall 27 about hinge means 21 and held in the angled position by the latch and detent assembly. FIG. 3 also shows several other elements of the latch and detent assembly that are not shown in FIGS. 1 and 2.

As can be seen from FIG. 3, arms 50 and 51 are extending out from the inside of upper housing 12 through two slots 111 and 112, respectively. Slots 111-112 are located on inner wall 27 of upper housing 12. Arms 50 and 51 also extend into display unit 13 via see-through slots 34 and 35, respectively. When display unit 13 is not in the angled position as shown in FIG. 2, arms 50 and 51 can extend out of slots 34 and 35 to deliver hooks 52 and 53, respectively. When display unit 13 is in the angled position as shown in FIG. 3, arms 50 and 51 stay inside slots 34 and 35. It shall be noted that arms 50 and 51 may also extend out of slots 34-35 when display unit 13 is in the angled position.

Arms 50 and 51 each includes a curved bottom edge. Along each curved edge there are a plurality of notches. Arm 50 includes a plurality of notches 54 and arm 51 includes a plurality of notches 55. Notches 54 are spaced along the bottom edge of arm 50. Notches 55 are spaced along the bottom edge of arm 51. In the presently preferred embodiment, each of notches 54 and 55 is curved shaped. In alternative embodiments, each of notches 54 and 55 may be in other forms of shape. For example, each of notches 54 and 55 may be V-shaped.

The curve of the bottom edge of each of arms 50–51 is concentric with the swing curve of the swing movement of display unit 13 about hinge means. In other words, the curve of the bottom edge of each of arms 50 and 51 reflects and follows the swing movement of display unit 13.

The latch and detent assembly also includes two detent member 56 and 57. Detent members 56 and 57 are inside display unit 13 mounted below slots 34 and 35. The purpose of detent members 56 and 57 is to engage notches 54 and 55 when display unit 13 swings away from inner wall 27 in order to detain display unit 13 in the angled position for viewing.

Detent member 56 includes a protruding end portion 58. Detent member 57 includes a protruding end portion 59. Each of protruding end portions 58 and 59 slidably contacts the bottom edge of its respective one of arms 50 and 51. Protruding end portion 58 may engage with one of notches 54 and protruding end portion 59 may engage with a corresponding one of notches 55. In the presently preferred embodiment, protruding end portions 58 and 59 are in spherical shape. In alterative embodiments, protruding end portions 58 and 59 may be in other forms of shape. For example, protruding end portions 58 and 59 can be in triangular shape.

As described above, detent members 50 and 57 are mounted on display unit 13. When display unit 13 swings, detent members 56 and 57 also follow the swing movement of display unit 13. In this case, protruding end portions 58 and 59 slide along the bottom edges of arms 50 and 51 and through notches 54 and 55, respectively. When the display unit 13 stops its swing movement at a desired angle and each of protruding end portions 58 and 59 engages one of its corresponding notches 54 and 55, respectively, display unit 13 is detained in the angled position for viewing.

The angled position of display unit 13 for viewing can be adjusted by sliding the protruding end portions 58 and 59 into different ones of notches 54 and 55. Therefore, notches 54 and 55 provide different angles for display unit 13 for reviewing.

When the angled position for display unit 13 is not needed or when computer 10 is to be closed into the closed position as shown in FIG. 2, an external force can be applied to display unit 13 which causes the protruding end portions 58 and 59 to slide out of their respective ones of notches 54 and 55.

Figure 4:
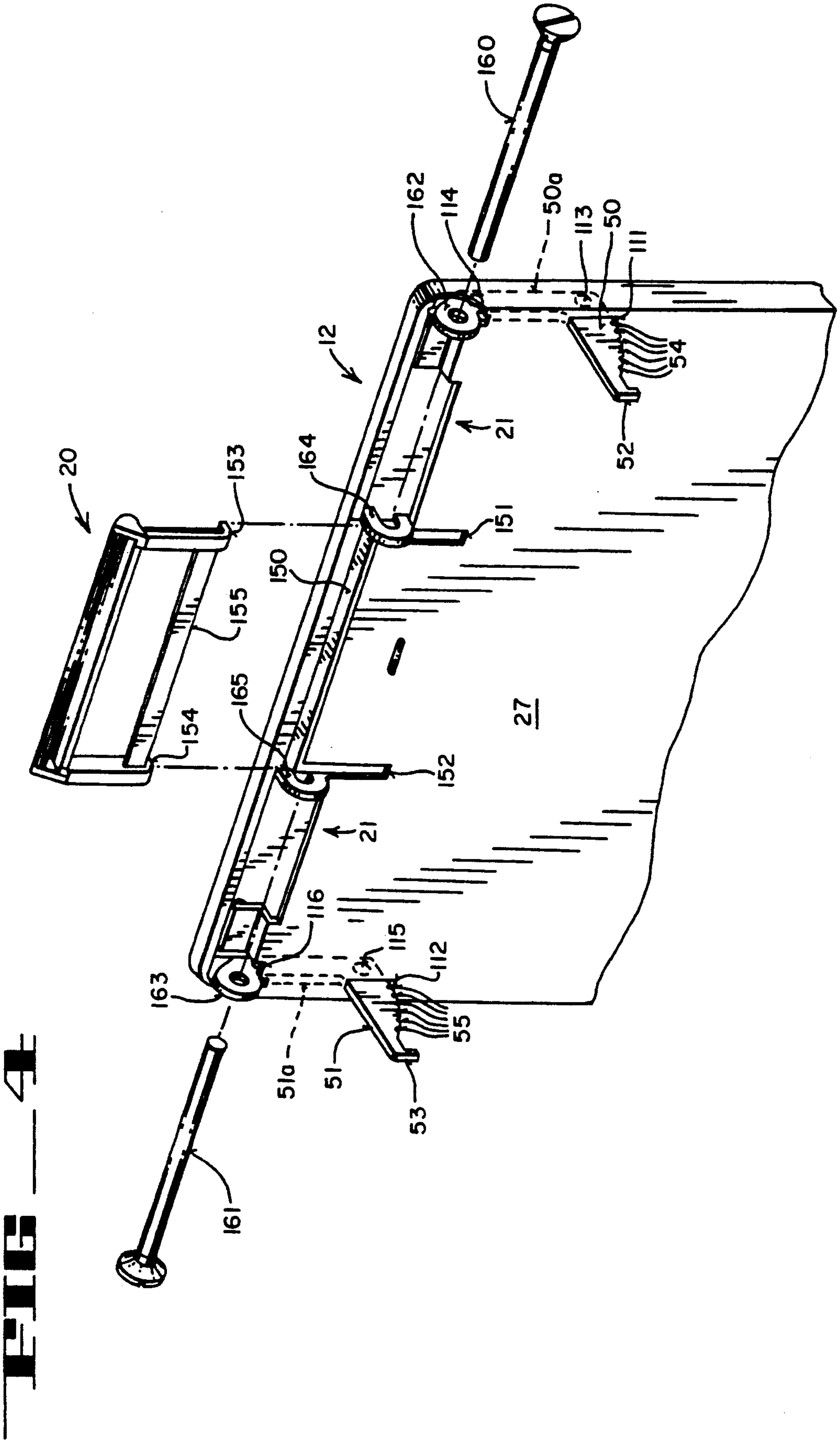
FIG. 4 is a perspective view of a portion of the upper housing of the computer that shows a handle, hinges, and the hooks of the latch and detent assembly.

Referring to FIG. 4, arms 50 and 51 of the latch and detent assembly as shown, each having hooks 52 and 53, respectively. As can be seen from FIG. 4, arm 50 is coupled to a vertical arm 50*a* inside upper housing 12 (shown in broken lines) via slot 111 and arm 51 is coupled to another vertical arm 51*a* inside upper housing 12 (also shown in broken line) via slot 112. Vertical arms 50*a* and 51*a* are mounted onto each of the side walls of upper housing 12, respectively. As can be seen from FIG. 4, vertical arm 50*a* is fastened by fastening means 113 and 114 and vertical arm 51*a* is by fastening means 115 and 116. Vertical arm 50*a* and arm 50 form an L-shaped arm structure to deliver hook 52. Vertical arm 51*a* and arm 51 form another L-shaped arm structure to deliver hook 53. Vertical arms 50*a* and 51*a* also deliver rings 162 and 163, respectively, at their end. Rings 162 and 163 are part of hinge means 21 which will be described below.

As also can be seen from FIG. 4, arms 50 and 51 each has the curved bottom edge. As described above, the curve of the bottom edge is concentric with the swing curve of the swing movement of display unit 13 about hinge means 21. Arm 50 includes notches 54 disposed evenly along its bottom edge and arm 51 includes notches 55 disposed evenly along its bottom edge.

As can be seen from FIG. 4, hinge means 21 is formed adjacent the top end of inner wall 27 of upper housing 12. Hinge means 21 includes two pivot pins 160 and 161. Each of pins 160–161 is screwed through each of rings 162 and 163, respectively, until they are settled at each of U-shaped rings 164 and 165, respectively. Display unit 13 (shown in FIGS. 1–3) is then rotatably attached to pin 160 between rings 162 and 164 and to pin 161 between rings 163 and 165. Both pins 160 and 161 have their end portions extending out of rings 164 and 165, respectively. The end portions of pins 160 and 161 act as a stop means for handle 20 which will be described below.

As described above, handle 20 can be lifted upward (FIG. 1) for carrying computer 10 when needed. When not needed, handle 20 can be retraced by sliding downward (FIG. 2). As can be seen from FIG. 4, handle 20 includes two hooks 153 and 154 that are extending into two slots 151 and 152 on inner wall 27. Hooks 153 and 154 can move upwardly and downwardly within slots 151 and 152. When handle 20 is lifted, hooks 153 and 154 also move upwardly and engage with the end portions of pins 160 162, respectively. This prevents handle 20 from further moving with respect to upper housing 12. Then, computer 10 can be lifted and carried by handle 20. When not needed, handle 20 can be pushed downwardly and hooks 153–154 slide downwardly along slots 151–152. By this arrangement, handle 20 requires minimum space when placed inside compute 10. As can be seen from FIG. 4, handle 20 only occupies a portion of space reserved for but unused by hinge means 21.

FIG. 5A is a side view of computer 10 in the closed position of FIG. 2, illustrating one hook 52 engaged with one locking member 58. FIG. 5B is another side view of computer 10, illustrating locking member 58 released from hook 52 and keyboard unit 15 being removed from computer 10. FIGS. 5A and 5B also show the gap between base 11 and display unit 13 as described above. In addition, FIGS. 5A and 5B illustrate vertical arm 50*a* and arm 50 (in broken lines) that deliver hook 52. FIGS. 5A and 5B also show fastening means 113 and 114 (in broken lines).

As can be seen from FIG. 5A, when keyboard unit 15 is closed to computer 10, hook 52 is engaged with locking member 58. This locks keyboard unit 15 in the closed position. As can be seen rom FIG. 5B, when release button 41 is pushed downward as indicated by the arrow, it releases locking member 58 from hook 52. This releases keyboard unit 15 which then can be removed from computer 10.

Referring to FIGS. 1–3, 5A and 5B, a plurality of feet are shown which are coupled to the bottom surface 24 of base 11 of computer 10. FIGS. 1 and 3 show a foot 25 which is coupled to the right front side of the bottom surface 24. FIG. 2 shows another identical foot 102 which is coupled to the left front side of the bottom surface 24. FIGS. 5A and 5B illustrate a third identical foot 202 which is coupled to the right rear side of the bottom surface 24. In the presently preferred embodiment, four identical feet, including feet 25, 102, and 202, are provided to couple to the bottom surface 24 of base 11. These feet are detachable from the bottom surface 24 and can be removed from the bottom surface 24 of base 11 when needed. The function of these feet is to make it possible for base 11, and therefore to computer 10, to stand or stack securely on different shapes of supporting surfaces beneath computer 10. The shape of those feet is thus formed to fit the shape of the support surface.

In alternative embodiments, more of fewer than four feet may be employed to couple to the bottom surface 24 of base 11. For example, eight feet may be employed to couple to the bottom surface 24 of base 11.

Figure 6:
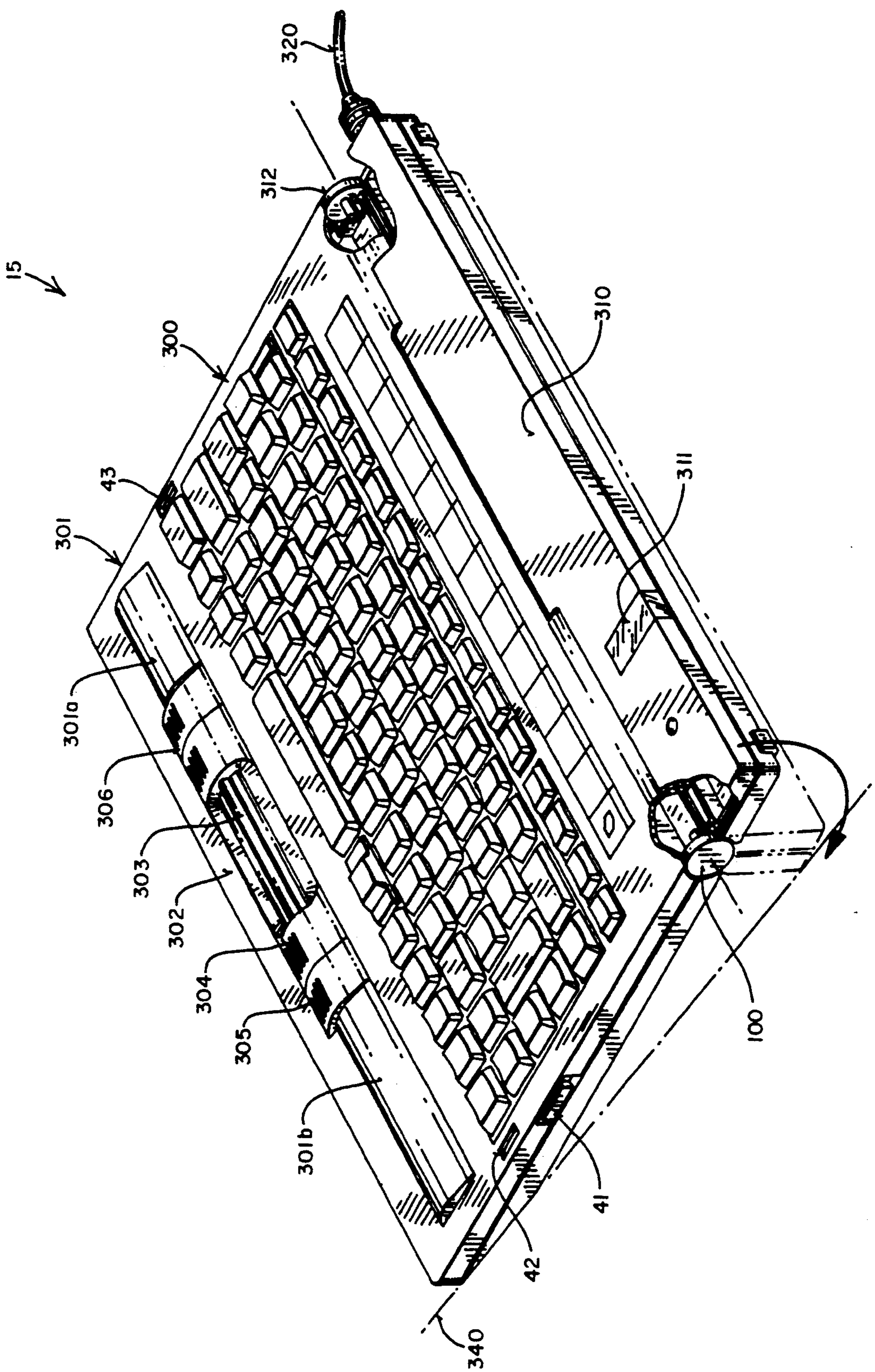
FIG. 6 shows the keyboard unit of the computer.

Referring to FIG. 6, keyboard unit 15 includes a conventional keyboard 300, a palm rest 301 and a cursor control device 302 located at the center area of palm rest 301 as shown in FIG. 6.

In one embodiment, keyboard 300 of keyboard unit 15 is a conventional "QUERTY" keyboard which includes a bottom row of keys and a top row of keys. In alternative embodiments, other types of keyboards can be employed.

Below keyboard 300 is palm rest 301 which extends away from keyboard 300 towards the user of the computer. As described above, palm rest 301 allows the user's hands and/or wrists to rest against a surface which is an integral part of keyboard unit 15 when using keyboard 300 or cursor control device 302, especially when in the laptop environment (i.e., when keyboard unit 15 is resting on the user's lap rather than on a desktop). This permits the user to extend his/her arms away from the body in a more relaxed state, reducing muscle fatigue in the arms and shoulders. In the presently preferred embodiment, palm rest 301 includes two contoured members 301*a* and 301*b* adjacent cursor control device 302. One purpose of the contoured members 301*a* and 301*b* is to fit the curve of the human hands or wrists. This allows the user to put the hands or wrists on palm rest 301 comfortably. Another purpose of member 301*a* and 301*b* is to keep the remaining of keyboard unit 15 from touching display screen 14 of display unit 13 when computer 10 is in the closed position as shown in FIG. 2.

Cursor control device 302 of keyboard unit 15 is mounted in the palm rest area near the center of palm rest 301, below keyboard 300. Cursor control device 302 includes a cursor positioning device 303 and switches which are typically actuated by buttons 304–306. Cursor control device 302 allows the user to control the movement of the movable cursor 36 on display screen 14 (FIG. 1) in the conventional manner and selects a desired operation, such as the selection of a software option by moving the cursor with cursor positioning device 303 and by signaling selections with the switches which are activated by buttons 304–306.

Cursor positioning device 303 may be any one of the well known means for positioning a cursor, including a touchpad or a trackball. In the presently preferred embodiment, cursor positioning device 302 includes a cylindrical shaft moveably disposed within a recess area of button 304. The shaft can be moved laterally and rotated forwardly and backwardly within button 304. Cursor positioning device 302 also includes a converter (not shown) that converts the movement and rotation of the shaft into electrical signal indicative of X-Y locations defined on display screen 14 (FIG. 1).

Keyboard unit 15 also includes a rear end section 310 rotatably coupled to keyboard 300 by hinge means 100. The rear end section 310 functions as supporting legs to give the top of keyboard unit 15 a slight slope of several degrees with respect to a flat supporting surface 340 on which keyboard unit 15 is lying when the rear end section 310 is rotated at a down position against surface 340. The inclined slope of keyboard unit 15 is often preferred by users. Hinge means 312 is a conventional hinge.

Referring again to FIG. 2, keyboard unit 15 includes a flat bottom surface 81 and a sloped button surface 90 near the front end of keyboard unit 15. The purpose of the sloped bottom surface 90 is to contact the supporting surface 340 (FIG. 6) of keyboard unit 15 when keyboard unit 15 is positioned in a slope for use. This sloped surface 90 causes more bottom surface of keyboard unit 15 to be in contact with the supporting surface 340, thus making keyboard unit 15 more stable in operation.

Referring back to FIG. 6, the rear end section 310 is retractable from its down position by rotating it upward so that the rear end section 310 does not provide the slope for keyboard unit 15.

The rear end section 310 is coupled to a connection cable 320. The other end of connection cable 320 is coupled to upper housing 12 of computer 10. Connection cable 320 is employed to transfer commands and/or data generated by keyboard 300 and cursor control device 302 to computer 10. The rear end section 310 also includes circuitry (not shown) for interfacing with connection cable 320 and for transmitting the data from keyboard unit 15 to computer 10 via connection cable 320.

The rear end section 310 also includes a transmitter means 311 for providing wireless communication between keyboard unit 15 and computer 10. In one preferred embodiment, the transmitter means 311 is a radio transmitter that can modulate the input data and/or commands received from keyboard 300 and cursor control device 302 onto a radio frequency signal and transmit the modulated signal out to computer 10 wirelessly. In another preferred embodiment, the transmitter means 311 is an infrared signal transmitter that modulates the input data and/or commands for keyboard 300 and cursor control device 302 onto an infrared signal and transmits the modulated signal out to computer 10 wirelessly. As described above, computer 10 includes a receiver 37 (FIG. 1) which may be a radio signal receiver or an infrared signal receiver depending the type of transmitter means 311. Receiver 37 receives the wireless signal and demodulates it. In this case, keyboard unit 15 can be completely physically detached from computer 10 during operation. This allows keyboard unit 15 to be placed anywhere within the range of the transmission. In addition, the user, when operating keyboard unit 15, can move around with keyboard unit 15 freely.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A portable personal computer, comprising:

a main housing having a base and an upper housing erecting on top of a portion of said base;

a display attached to said upper housing adjacent a top end of said upper housing;

a detachable keyboard, wherein said detachable keyboard can be mounted onto said base and covers said display in a closed position such that said computer constitutes an integrated entity; and a latch and detent assembly for locking said keyboard in said closed position and for holding said display at a desired angle for viewing when said display swings away from said upper housing in an open position, wherein said latch and detent assembly comprises (1) hook means coupled adjacent said top end of said upper housing of said main housing, wherein said hook means includes an arm passing through said display and a plurality of notches spaced along said arm;

(2) locking means coupled to said keyboard for releasably engaging said hook means such that said keyboard can be mounted and locked onto said computer in said closed position; and (3) detent means coupled to said display for engaging one of said plurality of notches along said arm in said open position in order to detain said display at a desired angle for viewing.

2. A portable personal computer, comprising:

a main housing having a base and an upper housing erecting on top of a portion of said base;

a display pivotally attached to said upper housing adjacent a top end of said upper housing;

a detachable keyboard; and a latch and detent assembly for locking said keyboard onto said computer in a closed position and for holding said display at a desired angle for viewing when said display swings away from said upper housing in an open position, wherein said latch and detent assembly comprises:

(i) hook means having an arm with a first end and a second end, a downward extending bar coupled to said first end of said arm, and a hook coupled to said second end of said arm, wherein said bar is coupled adjacent said top end of said upper housing and is located inside said upper housing, wherein said arm passes through said display to deliver said hook, wherein said arm includes a curved bottom edge that reflects the swing movement of said display, wherein said arm includes a plurality of notches spaced along said curved bottom edge;

(ii) locking means coupled to said keyboard for releasably engaging said hook of said hook means such that said keyboard can be mounted and locked onto said computer and covers said display in said closed position in order for said computer to constitute an integrated entity, wherein said locking means disengages said hook to remove said keyboard from said computer in said open position, wherein said display is exposed when said keyboard is removed from said computer; and (iii) detent means coupled to said display and having a protruding end portion that can slide into each of said plurality of notches for engaging one of said plurality of notches along said arm in said open position in order to detain said display at a desired angle for viewing, wherein said end portion of said detent means slides through said plurality of notches when said display swings away from said inner wall of said upper housing by an external force, wherein when said display stops its swing movement and said end portion slides into said one of said plurality of notches, said display is detained by said detent means from free swinging back against said inner wall, wherein said desired angle for viewing of said display is adjustable by sliding said detent means into different ones of said plurality of notches.

3. The portable personal computer of claim 2, wherein said hook is extending downwardly from said arm.

4. The portable personal computer of claim 2, wherein said locking means further comprises a spring biased release button, wherein said locking means can be released from being engaged with said hook means by said release button.

5. The portable personal computer of claim 2, wherein each of said plurality of notches includes a curve shaped surface, wherein said protruding end portion of said detent means is in spherical shape.

6. The portable personal computer of claim 2, wherein detent means slides out of said one of said plurality of notches when said display is pushed towards said inner wall of said upper housing.

7. A portable personal computer, comprising:

a main housing having a base and an upper housing erecting on top of a portion of said base for containing circuitry of said computer, wherein said base contains a power supply unit for the computer, wherein said upper housing includes a top end and an inner wall;

display means pivotally attached to said upper housing adjacent said top end of said upper housing such that said display means is held against said inner wall of said upper housing in a closed position, wherein said display means can swing away from said inner wall of said upper housing in an open position;

detachable keyboard means for inputting data into said portable personal computer, wherein said keyboard means is mounted onto said computer and covers said display means in said closed position such that said computer constitutes an integrated entity, wherein said keyboard means is removed from said computer in said open position for operation, wherein said display means is exposed when said keyboard means is removed from said computer; and latch and detent means that includes:

(1) hook means coupled adjacent said top end of said upper housing of said main housing, wherein said hook means includes an arm passing through said display means and a plurality of notches spaced along said arm;

(2) locking means coupled to said keyboard means for releasably engaging said hook means such that said keyboard means can be mounted and locked onto said computer in said closed position; and (3) detent means coupled to said display means for engaging one of said plurality of notches along said arm in said open position in order to detain said display means at a desired angle for viewing, wherein said detent means slides through said plurality of notches when said display means swings away from said inner wall of said upper housing by an external force, wherein when said display means stops its swing movement and said detent means slides into said one of said plurality of notches, said display means is detained by said detent means from free swinging back against said inner wall, wherein said desired angle for viewing of said display means is adjustable by sliding said detent means into different ones of said plurality of notches.

8. The portable personal computer of claim 7, wherein each of said plurality of notches includes a curve shaped surface, wherein said detent means further includes a spherical shaped end portion.

9. The portable personal computer of claim 7, wherein said hook means is an L-shaped structure having (1) a downward extending bar in said upper housing and coupled to a first end of said arm and (2) a downward extending hook coupled to a second end of said arm, wherein said hook engages said locking means when said keyboard means is in said closed position.

10. The portable personal computer of claim 7, wherein said arm has a curved bottom edge that reflects the swing movement of said display means, wherein said plurality of notches are spaced along said curved bottom edge of said arm.

11. The portable personal computer of claim 7, wherein said locking means further comprises a release button, wherein said locking means can be released from being engaged with said hook means by said release button.

12. The portable personal computer of claim 11, wherein said release button is a spring biased release button.

* * * * *